(12) United States Patent
Sekharan

(10) Patent No.: US 10,686,887 B2
(45) Date of Patent: Jun. 16, 2020

(54) ACCESSING RESOURCES HOSTED ON DIFFERENT DOMAINS

(71) Applicant: SAP SE, Walldorf (DE)

(72) Inventor: Satishkumar Sekharan, Coquitlam (CA)

(73) Assignee: SAP SE, Walldorf (DE)

( * ) Notice: Subject to any disclaimer, the term of this patent is extended or adjusted under 35 U.S.C. 154(b) by 267 days.

(21) Appl. No.: 15/388,249

(22) Filed: Dec. 22, 2016

(65) Prior Publication Data

US 2018/0063252 A1 Mar. 1, 2018

Related U.S. Application Data

(60) Provisional application No. 62/382,186, filed on Aug. 31, 2016.

(51) Int. Cl.
| | |
|---|---|
| *G06F 15/16* | (2006.01) |
| *H04L 29/08* | (2006.01) |
| *H04L 29/06* | (2006.01) |
| *H04L 12/58* | (2006.01) |

(52) U.S. Cl.
CPC .......... *H04L 67/141* (2013.01); *H04L 65/403* (2013.01); *H04L 65/4092* (2013.01); *H04L 65/80* (2013.01); *H04L 67/142* (2013.01); *H04L 67/36* (2013.01); *H04L 51/046* (2013.01); *H04L 65/1069* (2013.01); *H04L 67/02* (2013.01)

(58) Field of Classification Search
CPC ..... H04L 67/14; H04L 67/141; H04L 67/142; H04L 29/06326; H04L 29/08576; H04L 65/403; H04L 51/046; H04L 65/1069; H04L 67/02; H04L 67/36; H04L 65/80; H04L 65/4092

USPC ........ 709/204, 205, 206, 217, 219, 227, 228
See application file for complete search history.

(56) References Cited

U.S. PATENT DOCUMENTS

| | | | |
|---|---|---|---|
| 7,003,550 B1* | 2/2006 | Cleasby ............ | G06F 17/30873 707/E17.111 |
| 2002/0062347 A1* | 5/2002 | Low ....................... | G06Q 30/06 709/204 |
| 2004/0024881 A1* | 2/2004 | Elving ................ | H04L 67/1008 709/227 |
| 2005/0102358 A1* | 5/2005 | Gold ................. | G06F 17/30867 709/204 |

(Continued)

*Primary Examiner* — Liang Che A Wang
*Assistant Examiner* — Johnny B Aguiar
(74) *Attorney, Agent, or Firm* — Fountainhead Law Group P.C.

(57) ABSTRACT

Some embodiments provide a non-transitory machine-readable medium stores a program. The program interacts, through a first page of a web browser application, with an application hosted on a first domain. The program further establishes, through a second page embedded in the first page, a bidirectional communication channel with a service instance hosted on a second domain. The service instance is configured to facilitate communication for a collaboration session between the computing device and a set of computing devices interacting with the application. The program also receives data for the collaboration session through the first page of the web browser application. The program further transmits the data through the bidirectional communication channel by sending the data from the first page to the second page and forwarding the data to the service instance.

20 Claims, 8 Drawing Sheets

(56) References Cited

U.S. PATENT DOCUMENTS

| | | | |
|---|---|---|---|
| 2008/0282140 A1* | 11/2008 | Ioffe | G06Q 30/02 |
| | | | 715/205 |
| 2011/0289156 A1* | 11/2011 | Pirnazar | G06F 17/30873 |
| | | | 709/206 |
| 2014/0019884 A1* | 1/2014 | Dinan | H04L 12/1813 |
| | | | 715/758 |
| 2016/0294954 A1* | 10/2016 | Khayrudinov | H04L 67/02 |
| 2016/0321216 A1* | 11/2016 | Amacker | G06Q 10/10 |

* cited by examiner

ACCESSING RESOURCES HOSTED ON DIFFERENT DOMAINS

CROSS-REFERENCE TO RELATED APPLICATION

The present application claims the benefit and priority of U.S. Provisional Application No. 62/382,186, filed Aug. 31, 2016, entitled "Load Balancing for Collaboration Service," the entire contents of which are incorporated herein by reference in its entirety for all purposes.

BACKGROUND

Modern computer systems include a variety of different applications, programs, tools, etc. to perform a number of different operations and tasks. Many such computing systems have a web browser application that is used to access resources (e.g., web pages, services, applications, etc.) over one or more networks (e.g., a local area network (LAN), an Intranet, the Internet, etc.). These resources are often hosted on other computing systems connected to the one or more networks. In many cases, a web browser application uses a hypertext transport protocol (HTTP)-based technology to access such resources.

Some computing systems host resources that are accessed often and/or by many clients. These computing systems may have several instances of the resources and include a load balancer to distribute the requests for the resources across the instances of the resources. This way, one instance of the resources is not overloaded when the computing system receives a sudden increase in requests for resources.

SUMMARY

In some embodiments, a non-transitory machine-readable medium stores a program. The program interacts, through a first page of a web browser application, with an application hosted on a first domain. The program further establishes, through a second page embedded in the first page, a bidirectional communication channel with a service instance hosted on a second domain. The service instance is configured to facilitate communication for a collaboration session between the computing device and a set of computing devices interacting with the application. The program also receives data for the collaboration session through the first page of the web browser application. The program further transmits the data through the bidirectional communication channel by sending the data from the first page to the second page and forwarding the data to the service instance.

In some embodiments, the program may further send a request to join the collaboration session. In response to the request, the program may also receive a collaboration session identifier associated with the collaboration session. The service instance may be a first service instance in a plurality of service instances hosted on the second domain. Establishing the bidirectional communication channel with the service instance may include sending the collaboration session identifier to a load balancer for the load balancer to forward the request to a second service instance in the plurality of service instances and receiving, via the load balancer, a session identifier associated with the first service instance and a service identifier associated with the first service instance. Establishing the bidirectional communication channel with the service instance may further include sending a request that includes the session identifier and the service identifier to the load balancer for the load balance to determine to forward the request to the service instance based on the service instance identifier. The request may be a hypertext transfer protocol request. Establishing the bidirectional communication channel with the service instance may further include including the session identifier and the service identifier in a header of the request.

In some embodiments, the data for the collaboration session may be a first data. The program may further receive, through the bidirectional communication session, second data for the collaboration session from the service instance. The second data may originate from one of the computing devices in the set of computing devices. The program may also forward the second data from the second page to the first page for the first page to process the second data. The bidirectional communication channel may be a Websocket communication channel.

In some embodiments, a method interacts, through a first page of a web browser application, with an application hosted on a first domain. The method further establishes, through a second page embedded in the first page, a bidirectional communication channel with a service instance hosted on a second domain. The service instance is configured to facilitate communication for a collaboration session between the computing device and a set of computing devices interacting with the application. The method also receives data for the collaboration session through the first page of the web browser application. The method further transmits the data through the bidirectional communication channel by sending the data from the first page to the second page and forwarding the data to the service instance.

In some embodiments, the method may further send a request to join the collaboration session. In response to the request, the method may also receive a collaboration session identifier associated with the collaboration session. The service instance may be a first service instance in a plurality of service instances hosted on the second domain. Establishing the bidirectional communication channel with the service instance may include sending the collaboration session identifier to a load balancer for the load balancer to forward the request to a second service instance in the plurality of service instances and receiving, via the load balancer, a session identifier associated with the first service instance and a service identifier associated with the first service instance. Establishing the bidirectional communication channel with the service instance may further include sending a request that includes the session identifier and the service identifier to the load balancer for the load balance to determine to forward the request to the service instance based on the service instance identifier. The request may be a hypertext transfer protocol request. Establishing the bidirectional communication channel with the service instance may further include including the session identifier and the service identifier in a header of the request.

In some embodiments, the data for the collaboration session may be a first data. The method may further receive, through the bidirectional communication session, second data for the collaboration session from the service instance. The second data may originate from one of the computing devices in the set of computing devices. The method may also forward the second data from the second page to the first page for the first page to process the second data. The bidirectional communication channel may be a Websocket communication channel.

In some embodiments, a computing system includes a set of processing units and a non-transitory computer-readable medium storing instructions. The instructions cause at least one processing unit to interact, through a first page of a web browser application, with an application hosted on a first domain. The instructions further cause the at least one processing unit to establish, through a second page of embedded in the first page, a bidirectional communication channel with a service instance hosted on a second domain. The service instance is configured to facilitate communication for a collaboration session between the computing device and a set of computing devices interacting with the application. The instructions also cause the at least one processing unit to receive data for the collaboration session through the first page of the web browser application. The instructions further cause the at least one processing unit to transmit the data through the bidirectional communication channel by sending the data from the first page to the second page and forwarding the data to the service instance.

In some embodiments, the instructions may further cause the at least one processing unit to send a request to join the collaboration session. In response to the request, the instructions may also cause the at least one processing unit to receive a collaboration session identifier associated with the collaboration session. The service instance may be a first service instance in a plurality of service instances hosted on the second domain. Establishing the bidirectional communication channel with the service instance may include sending the collaboration session identifier to a load balancer for the load balancer to forward the request to a second service instance in the plurality of service instances and receiving, via the load balancer, a session identifier associated with the first service instance and a service identifier associated with the first service instance. Establishing the bidirectional communication channel with the service instance may further include sending a request that includes the session identifier and the service identifier to the load balancer for the load balance to determine to forward the request to the service instance based on the service instance identifier. The request may be a hypertext transfer protocol request. Establishing the bidirectional communication channel with the service instance may further include including the session identifier and the service identifier in a header of the request.

In some embodiments, the data for the collaboration session may be a first data. The instructions may further cause the at least one processing unit to receive, through the bidirectional communication session, second data for the collaboration session from the service instance. The second data may originate from one of the computing devices in the set of computing devices. The instructions may also cause the at least one processing unit to forward the second data from the second page to the first page for the first page to process the second data.

The following detailed description and accompanying drawings provide a better understanding of the nature and advantages of the present invention.

DETAILED DESCRIPTION

In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Described herein are techniques for accessing resources hosted in different domains via a web browser application of a client device. In some embodiments, a first page of the web browser application connects to and interacts with an application hosted on a first domain. The application may have a collaboration feature that accesses a service hosted on a second domain. In order to access the service hosted on the second domain, the web browser application may create a second page embedded in the first page of the web browser application. The second page may be configured to establish a bidirectional communication channel with the service and serve as a proxy to facilitate communication of data for the collaboration feature between the first page and the service.

In some embodiments, service hosted on the second domain may employ techniques for managing bidirectional communication channels for different client devices utilizing the collaboration feature so that client devices collaborating together may communicate with each other and client devices not collaborating together may not communicated with each other. In some embodiments, the techniques include a technique for handling failovers of the service so that client devices collaborating together in a collaboration session may continue to communicate with each other.

Figure 1:
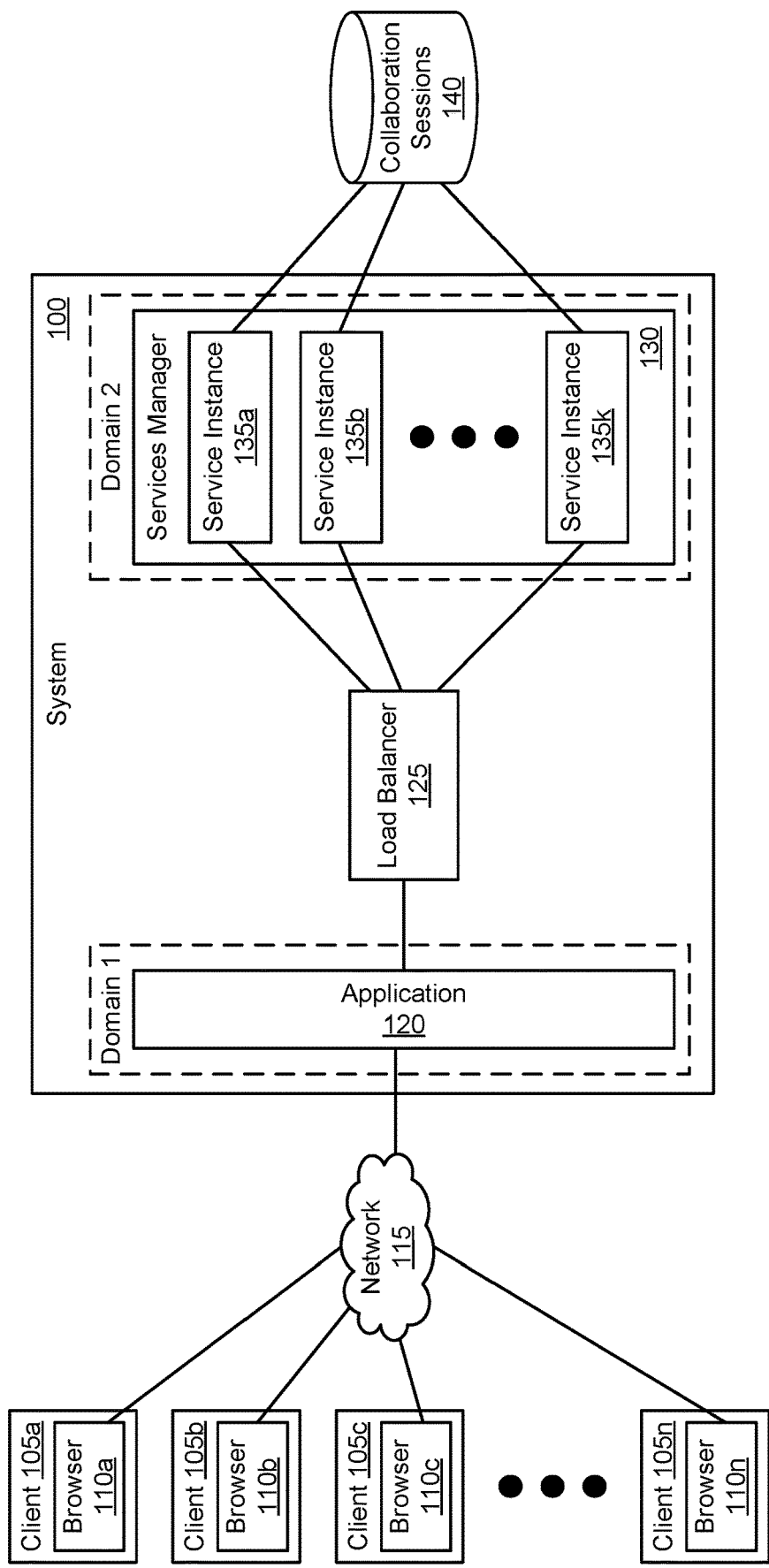
FIG. 1 illustrates a system according to some embodiments.

FIG. 1 illustrates a system 100 according to some embodiments. As shown, FIG. 1 also includes client devices 105*a-n*, network 115, and collaboration sessions storage 140. Network 115 may be any type of network configured to facilitate communication among client devices 105*a-n* and system 100 using a variety of network protocols. Network 115 may be a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc. Collaboration sessions storage 140 is configured to store information associated with collaboration sessions as explained in further detail below. While FIG. 1 shows collaboration sessions storage 140 as external to system 100, collaboration sessions storage 140 may be included in system 100 in some embodiments.

Each client device 105 includes a web browser application 110. Web browser application 110 is configured to communicate with system 100 via network 115 using any number of different protocols. Examples of such protocols include an HTTP protocol, an HTTP secure (HTTPS) protocol, a Websocket protocol, etc. Web browser application 110 may access and interact with application 120 via network 115. As described below, application 120 may include a collaboration feature that allows client devices 105*a-n* to participate in a collaboration session. A user of web browser application 110 may send application 120, via network 115, a request to start a collaboration session with one or more users of other client devices 105. In response, web browser application 110 may receive a response from application 120, via network 115, that includes a collaboration session identifier associated with a collaboration session, security information (e.g., a user token, an access token, etc.), and an indication that the collaboration session has started. In some embodiments, web browser application 110 stores the collaboration session identifier associated with the collaboration session and the security information for later use.

In some embodiments, a communication channel is used to facilitate communication among participants of a collaboration session. In some instances, the communication channel is bidirectional. In other instances, the communication channel is bidirectional and persistent. In yet other instances, the communication channel is a Websocket communication channel. In some embodiments, a service instance 135 may provide the communication channel for a collaboration session. Thus, upon receiving the collaboration session identifier, web browser application 110 may send a service instance 135, via load balancer 125, the collaboration session identifier. In response, web browser application 110 can receive from the service instance 135, via load balancer 125, a session identifier and a service instance identifier. In some embodiments, web browser application 110 stores the session identifier and the service instance identifier for later use. Web browser application 110 then sends a service instance 135, via load balancer 125, a request for a bidirectional communication channel that includes the session identifier and the service instance identifier. In some embodiments, such a request may be an HTTP/HTTPS request that includes the session identifier and the service instance identifier in a header of the request and also specifies a connection upgrade to a Websocket connection. In return, web browser application 110 may receive from the service instance 135 a connection to a bidirectional communication channel with the service instance 135.

In some cases, a web browser application 110 participating in a collaboration session may be removed from the collaboration session (e.g., a user of the web browser application 110 closes the web browser application 110) or the bidirectional communication channel fail for the collaboration session fails (e.g., the service instance 135 providing the bidirectional communication channel fails). In some such cases, a user of web browser application 110 can send application 120, via network 115, a request to rejoin the collaboration session that includes the session identifier of the collaboration session. In return, web browser application 110 may receive from application 120, via network 115, a response that includes a collaboration session identifier associated with the collaboration session, security information, and an indication that web browser application 110 has rejoined the collaboration session. Web browser application 110 then uses the collaboration session identifier to get a bidirectional communication channel with a service instance 135 for the collaboration session in the same manner described above.

As shown in FIG. 1, system 100 includes application 120, load balancer 125, and services manager 130. Application 120 is an application operating on system 100 that may be accessed by web browser applications 110a-n. Application 120 may be any number of different types of applications. For instance, application 120 may be an analytics application, a data management application, a human capital management application, an enterprise management application, a customer relationship management application, a financial management application, etc.

In some embodiments, application 120 includes a collaboration feature that allows client devices 105a-n to create and join a collaboration session. In some such embodiments, the collaboration feature allows client devices 105a-n interacting with the application 120 and participating in a collaboration session to share video, audio, desktop screens, messages, etc. with each other in a real-time manner. Application 120 may receive a request to start a collaboration session with one or more users of other client devices 105 from a web browser application 110. When application 120 receives such a request, application 120 sends a request that may include a collaboration session name, an identifier (ID) associated with a presenter of the collaboration session, a set of IDs associated with participants of the collaboration session, and security information (e.g., a user token, an access token, etc.) to a service instance 135 via load balancer 125. In some embodiments, the ID associated with the presenter and the set of IDs associated with the participants may be network identifiers (e.g., Internet Protocol (IP) addresses, hostnames, media access control (MAC) addresses, etc.) associated with client devices 105a-n and/or usernames of users of client devices 105a-n. In addition, application 120 may receive a request to rejoin a collaboration session from a web browser application 110 that includes a session identifier associated with the collaboration session. When application 120 receives such a request, application 120 sends the request to a service instance 135 via load balancer 125.

Application 120 may receive a response to a request to start a collaboration session or to rejoin a collaboration session from a service instance 135 via load balancer 125. In some embodiments, the response includes a session identifier associated with the service instance 135 and a service instance identifier associated with the service instance 135. Next, application 120 sends a request to update information associated with the collaboration session along with the session identifier and the service instance identifier to a service instance 135 via load balancer 125. In return, application 120 receives from the service instance 135 via the load balancer a response indicating that the collaboration session is successfully created along with security information (e.g., a user token, an access token, etc.), a collaboration session identifier associated with the collaboration session, and information associated with the collaboration session. Application 120 sends the security information, the collaboration session identifier, and information associated with the collaboration session to web browser application 110 that requested to start the collaboration session. Then, application 120 starts the collaboration session.

Load balancer 125 is responsible for managing requests for service instances 135a-k. For example, load balancer 125 may receive such a request from application 120. In response, load balancer 125 uses a load balancing technique to select a service instance 135 to which load balancer 125 forwards the request. In some embodiments, load balancer 125 uses a round robin load balancing technique in which load balancer 125 selects a service instance 135 from a list of the service instances 135a-k for a request and then iteratively selects service instances 135 for subsequent requests. When load balancer 125 reaches the end of the list (e.g., service instance 135k), load balancer 125 starts selecting service instances (e.g., service instance 135a) from the beginning of the list.

Load balancer 125 may receive from service instances 135a-k responses associated with the request mentioned above. When load balancer 125 receives such a response, load balancer 125 forwards it to application 120. In some embodiments, the response may include in a header of the response a session identifier associated with a service instance 135 from which load balancer 125 receives the response. In some such embodiments, load balancer 125 generates a service instance identifier associated with the service instance 135 and maintains a mapping between the service instance identifier and network information (e.g., an IP address, a hostname, a port, etc. or a combination thereof) associated with the service instance 135. Load balancer 125 may include the service instance identifier in the header of the response and then forward it to application 120. This way, when load balancer 125 receives a request from application 120 that includes the service instance identifier in a header of the response, load balancer 125 may select a service instance 135 to which the request is forwarded based on the mappings maintained by load balancer 125.

In some embodiments, load balancer 125 is a hardware load balancer. In other embodiments, load balancer 125 is a software load balancer. In yet other embodiments, load balancer 125 is a hybrid load balancer implemented using hardware and software.

Services manager 130 is responsible for managing service instances operating on system 100. As shown, services manager 130 is managing service instances 135a-k. Services manager 130 may initialize additional service instances 135 and terminate initialized service instances 135. In this manner, services manager 130 may scale up or down the number of service instances 135 based on demand for service instances 135. In some embodiments, services manager 130 assigns each service instance 135a-k network information (e.g., an IP address, a hostname, a port, etc. or a combination thereof) associated the service instance 135.

Each service instance 135 is configured to provide services for collaboration sessions. For instance, each service instance 135 can handle requests from application 120 to start a collaboration session. As mentioned above, a request to start a collaboration session may include a collaboration session name, an ID associated with a presenter of the collaboration session, and a set of IDs associated with participants of the collaboration session. When a service instance 135 receives a request to start a collaboration session, the service instance 135 creates a collaboration session and generates a session identifier associated with the service instance 135. The service instance 135 stores the session identifier with information associated with the collaboration session in collaboration sessions storage 140. Then, the service instance 135 sends a response that includes the session identifier in a header of the response to application 120 via load balancer 125.

In some embodiments, a service instance 135 can receive a request to rejoin a collaboration session that includes a session identifier from application 120 via load balancer 125. Upon receives such a request, the service instance 135 determines whether the session identifier is associated with the service instance 135. If the session identifier is associated with the service instance 135, the service instance 135 sends a response that includes the session identifier in a header of the response to application 120 via load balancer 125. If the session identifier is not associated with the service instance 135, the service instance 135 generates a session identifier associated with the service instance 135, identifies the information associated with a collaboration session that includes the received session identifier stored in collaboration sessions storage 140, and updates the received session identifier in the information associated with the collaboration session with the newly generated session identifier in collaboration sessions storage 140. Then, the service instance 135 sends a response that includes the newly generated session identifier in a head of the response to application 120 via load balancer 125.

A service instance 135 may receive a request to update information associated with a collaboration session along with a session identifier and a service instance identifier from application 120 via load balancer 125. When the service instance 135 receives such a request, the service instance 135 generates a collaboration session identifier associated with the collaboration session and stores the service instance identifier and the collaboration session identifier in collaboration sessions storage 140 with the information associated with a collaboration session that includes the session identifier. Then the service instance 135 sends application 120 via load balancer 125 a response indicating that the collaboration session is successfully created along with security information, the collaboration session identifier, and information associated with the collaboration session.

In some embodiments, a service instance 135 can receive a collaboration session identifier from a web browser application 110 via load balancer 125. Upon receiving the collaboration session identifier, the service instance 135 retrieves from collaboration sessions storage 140 the session identifier and service instance identifier associated with the collaboration session based on the collaboration session identifier. The service instance 135 then sends a response to the web browser application 110 via load balancer 125 that includes the session identifier and the service instance identifier.

A service instance 135 may receive a request for a bidirectional communication channel from a web browser application 110. The request may include a session identifier associated with the service instance 135 in a header of the request. When the service instance 135 receives such a request, the service instance 135 determines whether the collaboration session is valid by checking collaboration sessions storage 140 for information associated with a collaboration session that includes the session identifier. If collaboration sessions storage 140 includes such information, the service instance 135 establishes a bidirectional communication channel with the web browser application 110. Otherwise, the service instance 135 sends the web browser application 110 a response indicating that the collaboration session is not valid.

As illustrated in FIG. 1, application 120 is associated with Domain 1 while services manager 130 is associated with Domain 2. In some embodiments, application 120 may be accessed by web browser applications 110a-n via a reference to Domain 1. For example, a reference to Domain 1 may be a uniform resource locator (URL) of www.example1.com and, thus, application 120 may be accessed by navigating to www.example1.com through web browser applications 110a-n. Similarly, services manager 130 may be accessed by web browser applications 110a-n via a reference to Domain 2. For instance, a reference to Domain 2 may be a URL of www.example2.com and, thus, services manager 130 may be accessed by navigating to www.example2.com through web browser applications 110a-n.

FIG. 1 illustrates application 120 and services manager 130 associated with different domains (Domain 1 and Domain 2, respectively, in this example). In some embodiments, application 120 and services manager 130 associated with different subdomains. For example, application 120 may be associated with application.example.com while services manager 130 may be associated with services.example.com. One of ordinary skill in the art will appreciate that the domains and subdomains used herein are merely for the purposes of simplicity and explanation. Application 120 and services manager 130 may each be associated with one of any number of different domains or subdomains.

The following will describe several example operations of system 100. First, a collaboration session creation operation will be described, then a bidirectional communication channel creation operation will be described, and finally a collaboration session rejoin operation will be described. For the example collaboration session creation operation, a user of a web browser application 110 on a client device 105 sends application 120, via network 115, a request to start a collaboration session with one or more users of other client devices 105. When application 120 receives such the request, application 120 sends a request that includes a collaboration session name, an ID associated with a presenter of the collaboration session, a set of IDs associated with participants of the collaboration session, and security information to a service instance 135 via load balancer 125.

Upon receiving the request, load balancer 125 selects a service instance 135 to which the request is forwarded. In this example, load balancer 125 selects service instance 135a and forwards the request to service instance 135a. When service instance 135a receives the request, service instance 135a creates a collaboration session and generates a session identifier associated with service instance 135a. Next, service instance 135a stores the session identifier along with information associated with the collaboration session in collaboration sessions storage 140. Then, service instance 135a sends a response that includes the session identifier in a header of the response to application 120 via load balancer 125.

When load balancer 125 receives the response, load balancer 125 detects a session identifier in the header of the response. In response to the detection, load balancer 125 generates a service instance identifier associated with service instance 135a and maintains a mapping between the service instance identifier and network information (e.g., an IP address, a hostname, a port, etc. or a combination thereof) associated with service instance 135a. Load balancer 125 includes the service instance identifier in the header of the response and then forwards the response to application 120. Upon receiving the response from service instance 135a via load balancer 125, application 120 sends a request to update information associated with the collaboration session along with the session identifier and the service instance identifier to a service instance 135 via load balancer 125. When load balancer 125 receives the request, load balancer 125 selects a service instance 135 to which the request is forwarded. For this example, load balancer 125 selects service instance 135b and forwards the request to service instance 135b.

Once service instance 135b receives the request, service instance 135b generates a collaboration session identifier associated with the collaboration session and stores the service instance identifier and the collaboration session identifier in collaboration sessions storage 140 with the information associated with a collaboration session that includes the session identifier. In this example, service instance 135b stores the service instance identifier and the collaboration session identifier with the information that service instance 135a stored in collaboration sessions storage 140 described above. Service instance 135b then sends application 120, via load balancer 125, a response indicating that the collaboration session is successfully created along with security information, the collaboration session identifier, and information associated with the collaboration session.

Next, load balancer 125 forwards the response, the security information, the collaboration session identifier, and the information associated with the collaboration session to application 120, which application 120, in turn, forwards to the web browser application 110. Application 120 then starts the collaboration session. When the web browser application 110 receives the security information, the collaboration session identifier, and the information associated with the collaboration session, the web browser application 110 stores them for later use.

An example bidirectional communication channel creation operation will now be described and continues from the example collaboration session creation operation described above. The web browser application 110 sends a service instance 135, via load balancer 125, the collaboration session identifier. When load balancer 125 receives the collaboration session identifier, load balancer selects a service instance 135 to which the collaboration session identifier is forwarded. In this example, load balancer 125 selects service instance 135c (not shown in FIG. 1) and forwards the request to service instance 135c.

Once service instance 135c receives the collaboration session identifier from the web browser application 110, service instance 135c retrieves from collaboration sessions storage 140 the session identifier and the service instance identifier associated with the collaboration session based on the collaboration session identifier. Service instance 135c then sends a response to the web browser application 110 via load balancer 125 that includes the session identifier and the service instance identifier. Upon receiving the response, load balancer 125 forwards it to the web browser application 110.

When the web browser application 110 receives the session identifier and the service identifier, the web browser application 110 stores them for later use. Next, the web browser application 110 sends a service instance 135, via load balancer 125, a request for a bidirectional communication channel that includes the session identifier and the service instance identifier in a header of the request. Upon receiving the request, load balancer 125 detects that the request includes a service instance identifier in a header for the request. Based on the service instance identifier and the mappings that load balancer 125 maintains between service instance identifiers and network identifiers associated with service instances 135, load balancer 125 selects a service instance 135. In this example, load balancer 125 selects service instance 135a and forwards the request to service instance 135a. Upon receiving the request, service instance 135a determines that the collaboration session is valid since collaboration sessions storage 140 includes information associated with a collaboration session that includes the session identifier. As such, service instance 135a establishes a bidirectional communication channel with the web browser application 110.

An example collaboration session rejoin operation will be described and continues from the examples described above. In this example, service instance 135a that is providing the bidirectional communication channel for the collaboration session has failed. In response, a user of the web browser application 110 sends application 120, via network 115, a request to rejoin the collaboration session includes the session identifier of the collaboration session. When application 120 receives the request, application 120 sends the request to a service instance 135 via load balancer 125.

Upon receiving the request, load balancer 125 selects a service instance 135 to which the request is forwarded. Since service instance 135a has failed in this example, load balancer 125 may not select service instance 135a. For this example, load balancer 125 selects service instance 135b and forwards the request to service instance 135b.

Once service instance 135b receives the request, service instance 135b determines whether the session identifier is associated with service instance 135b. In this example, the session identifier is associated with service instance 135a. Thus, service instance 135b generates a session identifier associated with service instance 135b, identifies the information associated with a collaboration session that includes the session identifier associated with service instance 135a stored in collaboration sessions storage 140, and updates the session identifier associated with service instance 135a in the information associated with the collaboration session with the newly generated session identifier associated with service instance 135b in collaboration sessions storage 140. Service instance 135b then sends a response that includes the newly generated session identifier associated with service instance 135b to application 120 via load balancer 125.

When load balancer 125 receives the response, load balancer 125 generates a service instance identifier associated with service instance 135b and maintains a mapping between the service instance identifier and network information (e.g., an IP address, a hostname, a port, etc. or a combination thereof) associated with service instance 135b. Load balancer 125 includes the service instance identifier in the response and then forwards the response to application 120. Once application 120 receives the response, application 120 sends a request to update information associated with the collaboration session along with the session identifier and the service instance identifier to a service instance 135 via load balancer 125. When load balancer 125 receives the request, load balancer 125 selects a service instance 135 to which the request is forwarded. For this example, load balancer 125 selects service instance 135d (not shown in FIG. 1) and forwards the request to service instance 135d.

Once service instance 135d receives the request, service instance 135d generates a collaboration session identifier associated with the collaboration session and stores the service instance identifier and the collaboration session identifier in collaboration sessions storage 140 with the information associated with a collaboration session that includes the session identifier. In this example, service instance 135d stores the service instance identifier and the collaboration session identifier with the information that service instance 135b stored in collaboration sessions storage 140 described above. Service instance 135d then sends application 120, via load balancer 125, a response indicating that the collaboration session is successfully created along with security information, the collaboration session identifier, and information associated with the collaboration session.

Load balancer 125 then forwards the response, the security information, the collaboration session identifier, and the information associated with the collaboration session to application 120. Next, application 120 forwards the response, the security information, the collaboration session identifier, and the information associated with the collaboration session to the web browser application 110. Application 120 then starts the collaboration session. When the web browser application 110 receives the security information, the collaboration session identifier, and the information associated with the collaboration session, the web browser application 110 stores them for later use. The web application 110 then uses the collaboration session identifier to get a bidirectional communication channel with a service instance 135 for the collaboration session in a similar fashion as that described above in the example bidirectional communication channel creation operation.

Figure 2:
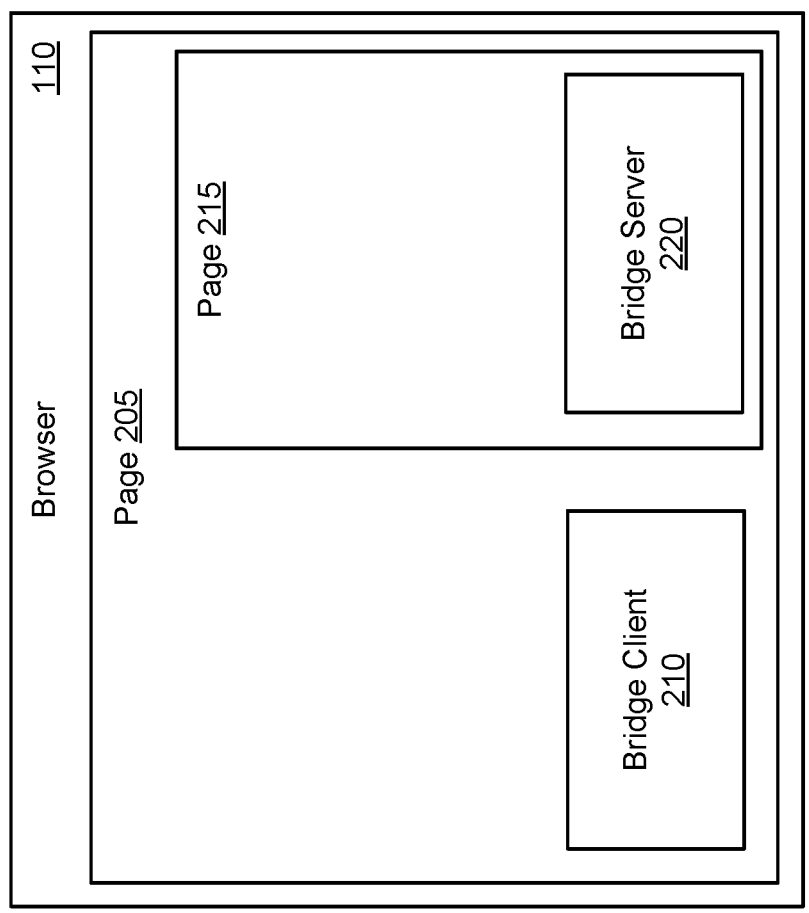
FIG. 2 illustrates a web browser application according to some embodiments.

FIG. 2 illustrates a web browser application 110 according to some embodiments. As shown, web browser application 110 includes pages 205 and 215, bridge client 210, and bridge server 220. Page 205 is a configured to retrieve and display information resources (e.g., a web page, an image, a video, a service, etc. or any combination there) hosted by application 120 of Domain 1. Page 205 may access such resources by navigating to a reference to Domain 1 such as a URL for Domain 1. As shown, page 215 is embedded in page 205. Page 215 is a configured to retrieve and display information resources (e.g., a web page, an image, a video, a service, etc. or any combination there) hosted by services manager 130 of Domain 2. In some embodiments, page 215 is implemented as an iFrame element in page 205. Page 215 can access such resources by navigating to a reference to Domain 2 such as a URL for Domain 2. While FIG. 2 shows page 215 as visible in web browser application 110, page 215 may be embedded in page 205 and not visible to a user of web browser application 110 in some embodiments.

In some embodiments, web browser application 110 instantiates bridge client 210 and bridge server 220 when a collaboration session is started. For example, web browser application 110 may instantiates bridge client 210 and bridge server 220 when web browser application 110 receives a response from application 120 that includes a collaboration session identifier associated with a collaboration session, security information, and an indication that the collaboration session has started.

Bridge client 210 is configured to connect to bridge server 220. Once connected, bridge client 210 may receive data (e.g., messages, etc.) from application 120, via page 205, that is associated with the collaboration session and that are for transmission to other participants in the collaboration session. Bridge client 210 sends such data to bridge server 220 using a bidirectional communication protocol. In addition, bridge client 210 may receive data associated with the collaboration session from bridge server 220. When bridge client 210 receives such data, bridge client 210 sends the data to page 205 for display and/or to application 120.

Bridge server 220 is configured to implement the operations for establishing a bidirectional communication channel for a collaboration session, as described above. Specifically, once the collaboration session has started, bridge server 220 sends a service instance 135, via load balancer 125, the collaboration session identifier. In response, bridge server 220 can receive from the service instance 135, via load balancer 125, a session identifier and a service instance identifier. Bridge server 220 then sends a service instance 135, via load balancer 125, a request for a bidirectional communication channel that includes the session identifier and the service instance identifier in a header of the request. In return, bridge server 220 receives from the service instance 135 a connection to a bidirectional communication channel with the service instance 135.

Bridge server 220 mimics an interface of a bidirectional communication channel to bridge client 210 so that, from the perspective of bridge client 210, bridge client 210 is connected to a service instance 135. As such, bridge server 220 serves as a bridge for a bidirectional communication channel between bridge client 210 and the service instance 135 providing the bidirectional communication channel. When bridge server 220 receives data from the service instance 135, bridge server 220 forwards it to bridge client 210. When bridge server 220 receives data from bridge client 210, bridge server 220 forwards it to the service instance 135.

Figure 3:
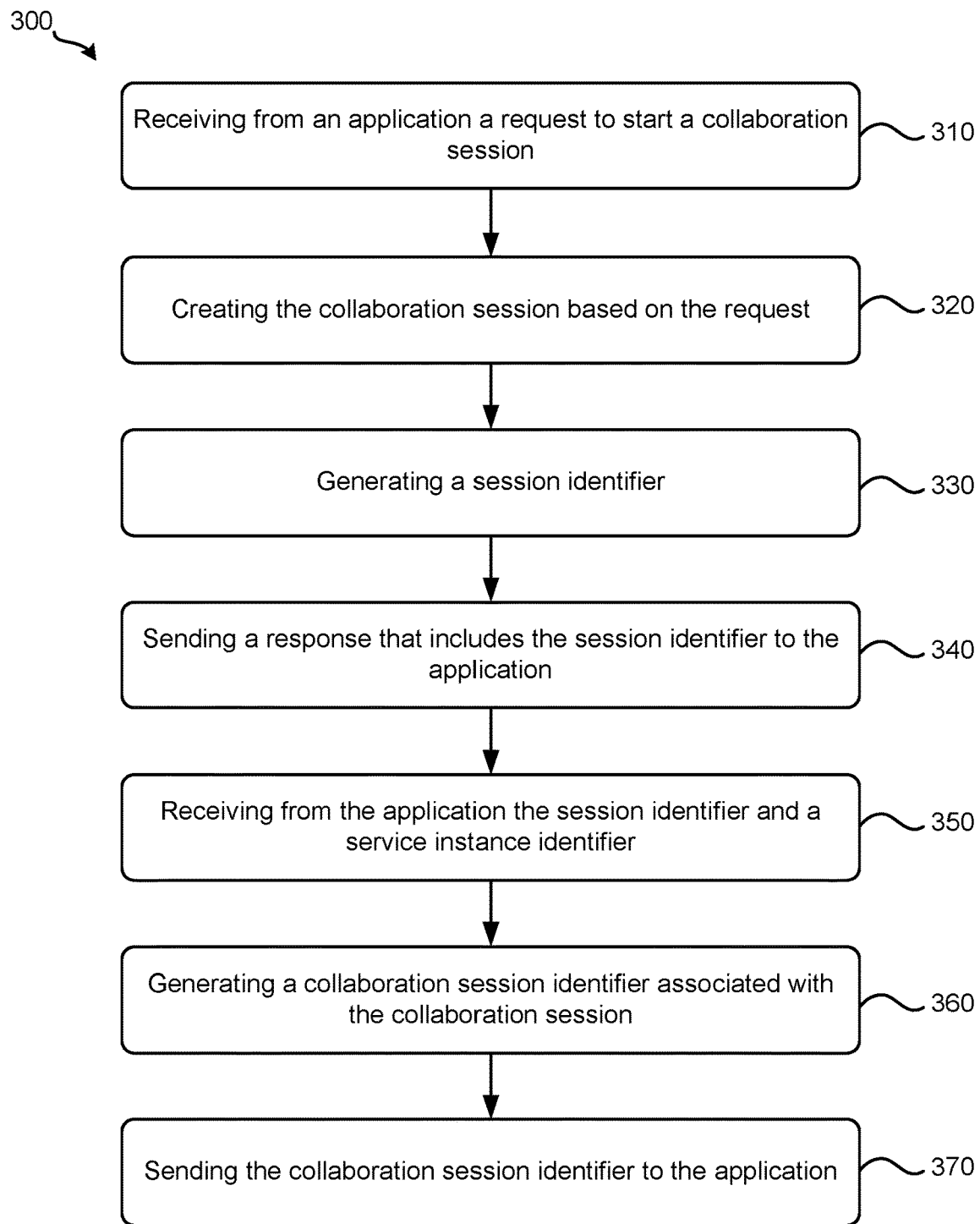
FIG. 3 illustrates a process for managing session information according to some embodiments.

FIG. 3 illustrates a process 300 for managing session information according to some embodiments. In some embodiments, services manager 130 perform process 300. Process 300 starts by receiving, at 310 from an application a request to start a collaboration session. Referring to FIG. 1 as an example, a service instance 135 selected by load balancer 125 performs operation 310. For example, when load balancer 125 receives the request from application 120, load balancer 125 selects service instance 135a to which the request is forwarded. Thus, service instance 135a receives the request from application 120 in this example. As explained above, such a request may include a collaboration session name, an ID associated with a presenter of the collaboration session, a set of IDs associated with participants of the collaboration session, and security information.

Next, process 300 creates, at 320, the collaboration session based on the request. Continuing with the example above, the service instance that performed operation 310 also performs operation 320. For this example, service instance 135a creates the collaboration session. In some embodiments, service instance 135a stores information associated with the collaboration session in collaboration sessions storage 140. Process 300 then generates, at 330, a session identifier. Continuing with the example above, the service instance that performed operations 310 and 320 also performs operation 330. In this example, service instance 135a generates a session identifier associated with service instance 135a. In some embodiments, service instance 135a stores the session identifier with the information associated with the collaboration session in collaboration sessions storage 140.

After operation 330, process 300 sends, at 340, a response that includes the session identifier in a header of the response to the application. Continuing with the example above, the service instance that performed operations 310-330 also performs operation 340. In this example, service instance 135a sends the response to application 120 via load balancer 125. When load balancer 125 receives the response, load balancer 125 detects a session identifier in the header of the response, generates a service instance identifier associated with service instance 135a, includes the service instance identifier in the header of the response, and forwards the response to application 120.

Next, process 300 receives, at 350, from the application the session identifier and a service instance identifier. Continuing with the example above, a service instance 135 selected by load balancer 125 performs operation 350, which may be the same service instance 135 selected to perform operations 310-340 or a different service instance 135. For this example, when load balancer 125 receives the session identifier and the service instance identifier, load balancer 125 select service instance 135b to which the request is forwarded. Accordingly, service instance 135b receives the session identifier and a service instance identifier from application 120 in this example. In some embodiments, service instance 135b stores the service instance identifier in collaboration sessions storage 140 with the information associated with a collaboration session that includes the session identifier.

Process 300 then generates, at 360, a collaboration session identifier associated with the collaboration session. Continuing with the example above, the service instance that performed operation 350 also performs operation 360. For this example, service instance 135b generates the collaboration session identifier. In some embodiments, service instance 135b stores the service instance identifier and the collaboration session identifier in collaboration sessions storage 140 with the information associated with a collaboration session that includes the session identifier. In this example, service instance 135b stores the service instance identifier and the collaboration session identifier with the information that service instance 135a stored in collaboration sessions storage 140 described above by reference to operation 330.

Finally, process 300 sends, at 370, the collaboration session identifier to the application. Continuing with the example above, the service instance that performed operations 350 and 360 also performs operation 370. In this example, service instance 135b sends the collaboration session identifier to application 120. In some embodiments, service instance 135b sends the collaboration identifier along with a response indicating that the collaboration session is successfully created, security information, and information associated with the collaboration session.

Figure 4:
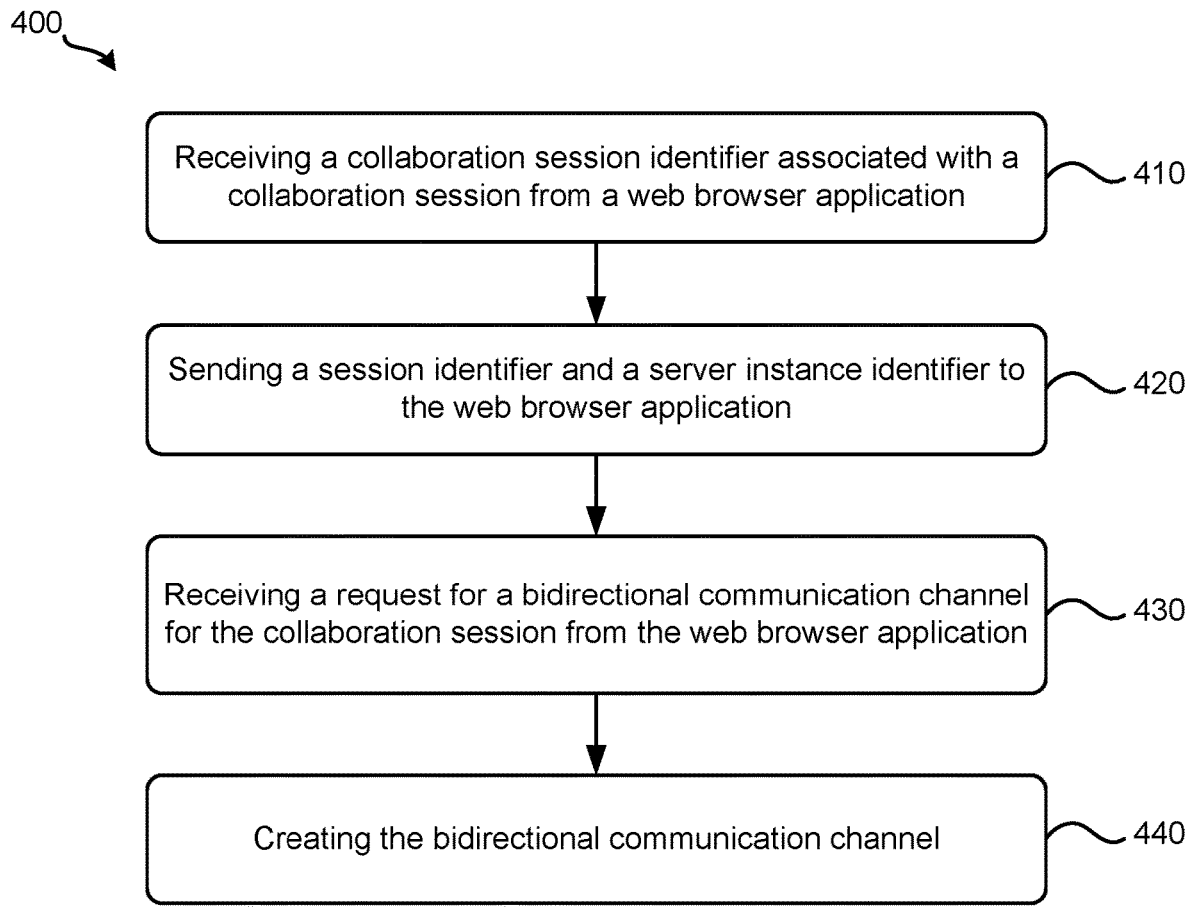
FIG. 4 illustrates a process for establishing a communication channel for a collaboration session according to some embodiments.

FIG. 4 illustrates a process 400 for establishing a communication channel for a collaboration session according to some embodiments. In some embodiments, services manager 130 performs process 400. Process 400 begins by receiving, at 410, a collaboration session identifier associated with a collaboration session from a web browser application. Referring to FIG. 1 as an example, a service instance 135 selected by load balancer 125 performs operation 410. For instance, when load balancer 125 receives the request from web a browser application 110, load balancer 125 selects service instance 135k to which the request is forwarded. As such, service instance 135k receives the collaboration session identifier from the web browser application 110 in this example. In some embodiments, when service instance 135k receives the collaboration session identifier, service instance 135k retrieves from collaboration sessions storage 140 a session identifier and a service instance identifier associated with the collaboration session based on the collaboration session identifier.

Next, process 400 sends, at 420, a session identifier and a server instance identifier to the web browser application. Continuing with the example above, the service instance that performed operation 410 also performs operation 420. In this example, service instance 135k sends the web browser application 110 the session identifier and the service instance identifier that service instance 135k retrieved from collaboration sessions storage 140, as described above.

Process 400 then receives, at 430, a request for a bidirectional communication channel for the collaboration session from the web browser application. Continuing with the example above, when load balancer 125 receives request, load balancer 125 detects that the request includes the service instance identifier in a header of the request. Based on the service instance identifier and mappings that load balancer 125 maintains between service instance identifiers and network identifiers associated with service instances 135, load balancer 125 selects a service instance 135. In this example, load balancer 125 has a mapping between the service instance identifier and network information associated with service instance 135a. Accordingly, load balancer 125 selects service instance 135a and forwards the request to service instance 135a.

Finally, process 400 creates, at 440, the bidirectional communication channel. Continuing with the example above, the service instance that performed operation 430 also performs operation 440. For this example, when service instance 135a receives the request, service instance 135a determines that the collaboration session is valid because collaboration sessions storage 140 includes information associated with a collaboration session that includes the session identifier. As such, service instance 135a creates the bidirectional communication channel with the web browser application 110.

Figure 5:
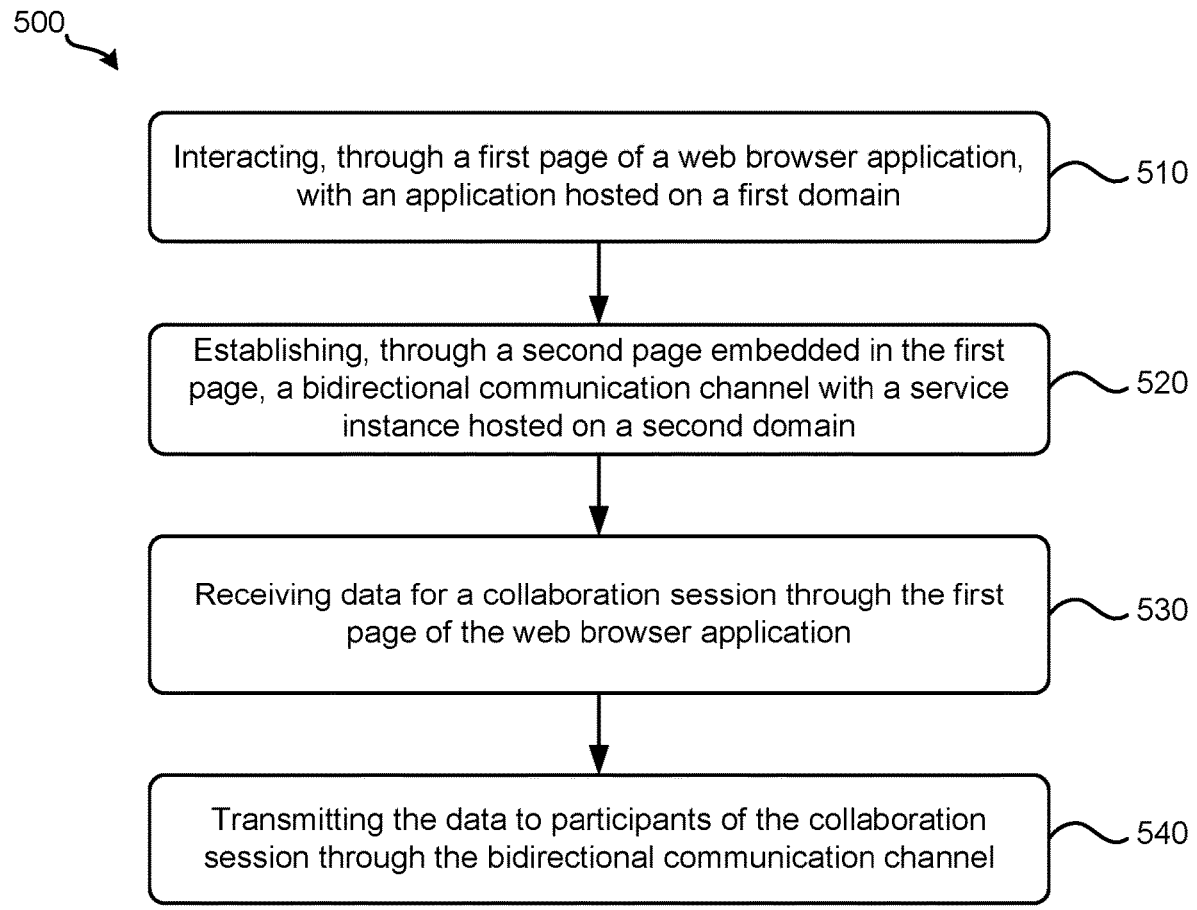
FIG. 5 illustrates a process for accessing resources hosted in different domains according to some embodiments.

FIG. 5 illustrates a process 500 for accessing resources hosted in different domains according to some embodiments. In some embodiments, a web browser application 110 performs process 500. Process 500 starts by interacting, at 510, through a first page of a web browser application, with an application hosted on a first domain. Referring to FIG. 2 as an example, page 205 of web browser application 110 retrieves and displays information resources hosted by application 120 of Domain 1. For this example, a user of web browser application 110 uses page 205 to start a collaboration session. In response, web browser application 110 instantiates bridge client 210 and bridge server 220 upon the start of the collaboration session.

Next, process 500 establishing, at 520, through a second page embedded in the first page, a bidirectional communication channel with a service instance hosted on a second domain. Continuing with the example above, bridge server 220, which is operating in page 215, performs operation 520. In some embodiments, bridge server 220 establishes the bidirectional communication channel by sending a service instance 135 a collaboration session identifier associated with a collaboration session. In response, bridge server 220 receives from the service instance 135 a session identifier and a service instance identifier. Bridge server 220 then sends a service instance 135 a request for a bidirectional communication channel that includes the session identifier and the service instance identifier in a header of the request. In return, bridge server 220 receives from the service instance 135 a connection to a bidirectional communication channel with the service instance 135.

Process 500 then receives, at 530, data for a collaboration session through the first page of the web browser application. Continuing with the example above, bridge client 210 performs operation 530. Bridge client 210 may receive data (e.g., messages, etc.) from application 120, via page 205, that is associated with the collaboration session and that are for transmission to other participants in the collaboration session. Bridge client 210 sends such data to bridge server 220 using a bidirectional communication protocol.

Finally, process 500 transmits, at 540, the data to participants of the collaboration session through the bidirectional communication channel. Continuing with the example above, bridge server 220 performs operation 500. When bridge server 220 receives the data from bridge client 210, bridge server 220 forwards it to the service instance 135 through the bidirectional communication channel.

Figure 6:
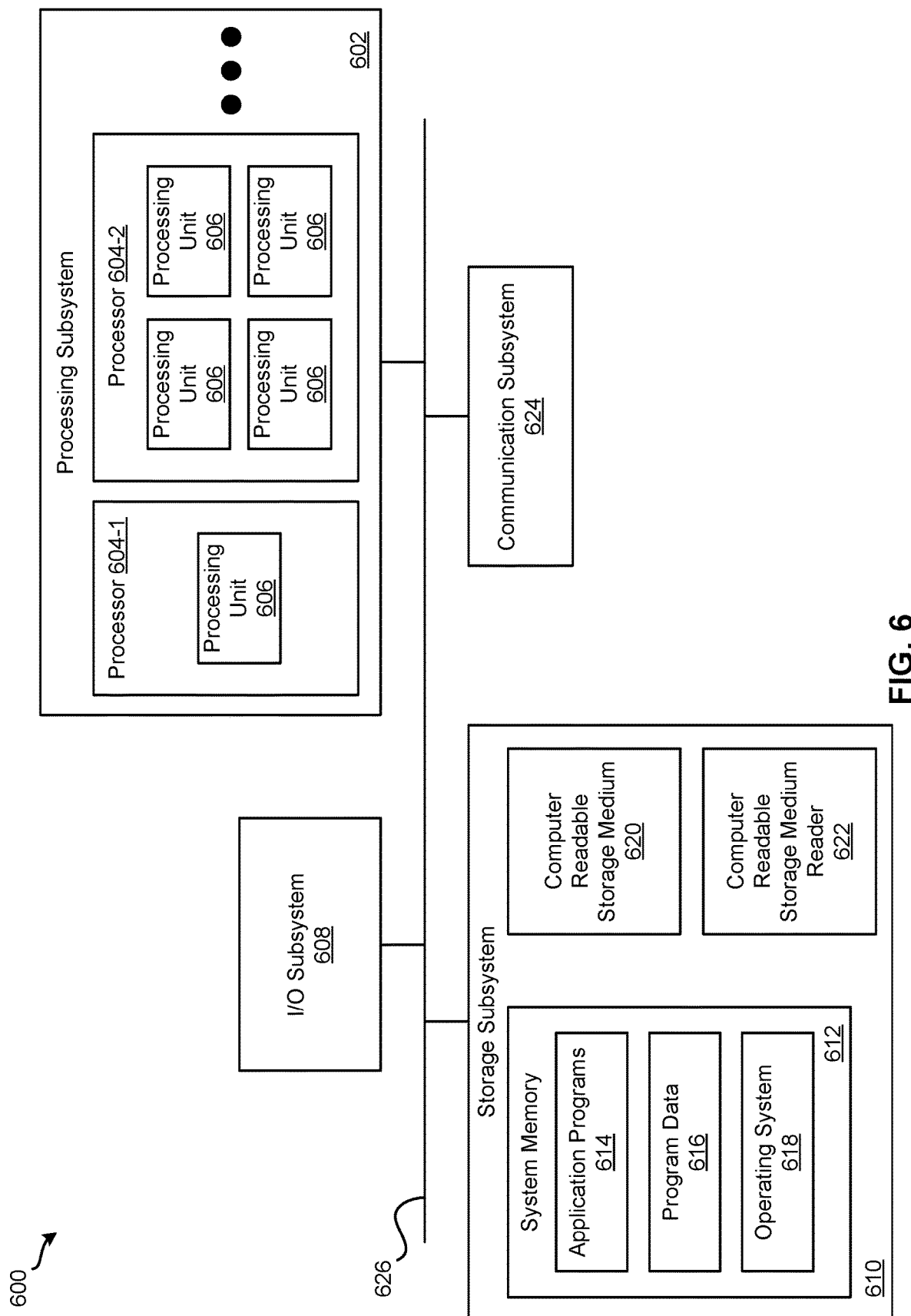
FIG. 6 illustrates an exemplary computer system for implementing various embodiments described above.

FIG. 6 illustrates an exemplary computer system 600 for implementing various embodiments described above. For example, computer system 600 may be used to implement client devices 105a-n and system 100. Computer system 600 may be a desktop computer, a laptop, a server computer, or any other type of computer system or combination thereof. Computer system 600 can implement many of the operations, methods, and/or processes described above (e.g., processes 300, 400, and 500). As shown in FIG. 6, computer system 600 includes processing subsystem 602, which communicates, via bus subsystem 626, with input/output (I/O) subsystem 608, storage subsystem 610 and communication subsystem 624.

Bus subsystem 626 is configured to facilitate communication among the various components and subsystems of computer system 600. While bus subsystem 626 is illustrated in FIG. 6 as a single bus, one of ordinary skill in the art will understand that bus subsystem 626 may be implemented as multiple buses. Bus subsystem 626 may be any of several types of bus structures (e.g., a memory bus or memory controller, a peripheral bus, a local bus, etc.) using any of a variety of bus architectures. Examples of bus architectures may include an Industry Standard Architecture (ISA) bus, a Micro Channel Architecture (MCA) bus, an Enhanced ISA (EISA) bus, a Video Electronics Standards Association (VESA) local bus, a Peripheral Component Interconnect (PCI) bus, a Universal Serial Bus (USB), etc.

Processing subsystem 602, which can be implemented as one or more integrated circuits (e.g., a conventional microprocessor or microcontroller), controls the operation of computer system 600. Processing subsystem 602 may include one or more processors 604. Each processor 604 may include one processing unit 606 (e.g., a single core processor such as processor 604-1) or several processing units 606 (e.g., a multicore processor such as processor 604-2). In some embodiments, processors 604 of processing subsystem 602 may be implemented as independent processors while, in other embodiments, processors 604 of processing subsystem 602 may be implemented as multiple processors integrate into a single chip or multiple chips. Still, in some embodiments, processors 604 of processing subsystem 602 may be implemented as a combination of independent processors and multiple processors integrated into a single chip or multiple chips.

In some embodiments, processing subsystem 602 can execute a variety of programs or processes in response to program code and can maintain multiple concurrently executing programs or processes. At any given time, some or all of the program code to be executed can reside in processing subsystem 602 and/or in storage subsystem 610. Through suitable programming, processing subsystem 602 can provide various functionalities, such as the functionalities described above by reference to processes 300, 400, 500, etc.

I/O subsystem 608 may include any number of user interface input devices and/or user interface output devices. User interface input devices may include a keyboard, pointing devices (e.g., a mouse, a trackball, etc.), a touchpad, a touch screen incorporated into a display, a scroll wheel, a click wheel, a dial, a button, a switch, a keypad, audio input devices with voice recognition systems, microphones, image/video capture devices (e.g., webcams, image scanners, barcode readers, etc.), motion sensing devices, gesture recognition devices, eye gesture (e.g., blinking) recognition devices, biometric input devices, and/or any other types of input devices.

User interface output devices may include visual output devices (e.g., a display subsystem, indicator lights, etc.), audio output devices (e.g., speakers, headphones, etc.), etc. Examples of a display subsystem may include a cathode ray tube (CRT), a flat-panel device (e.g., a liquid crystal display (LCD), a plasma display, etc.), a projection device, a touch screen, and/or any other types of devices and mechanisms for outputting information from computer system 600 to a user or another device (e.g., a printer).

As illustrated in FIG. 6, storage subsystem 610 includes system memory 612, computer-readable storage medium 620, and computer-readable storage medium reader 622. System memory 612 may be configured to store software in the form of program instructions that are loadable and executable by processing subsystem 602 as well as data generated during the execution of program instructions. In some embodiments, system memory 612 may include volatile memory (e.g., random access memory (RAM)) and/or non-volatile memory (e.g., read-only memory (ROM), programmable read-only memory (PROM), erasable programmable read-only memory (EPROM), electrically erasable programmable read-only memory (EEPROM), flash memory, etc.). System memory 612 may include different types of memory, such as static random access memory (SRAM) and/or dynamic random access memory (DRAM). System memory 612 may include a basic input/output system (BIOS), in some embodiments, that is configured to store basic routines to facilitate transferring information between elements within computer system 600 (e.g., during start-up). Such a BIOS may be stored in ROM (e.g., a ROM chip), flash memory, or any other type of memory that may be configured to store the BIOS.

As shown in FIG. 6, system memory 612 includes application programs 614 (e.g., web browser application 110, application 120, and services manager 130), program data 616, and operating system (OS) 618. OS 618 may be one of various versions of Microsoft Windows, Apple Mac OS, Apple OS X, Apple macOS, and/or Linux operating systems, a variety of commercially-available UNIX or UNIX-like operating systems (including without limitation the variety of GNU/Linux operating systems, the Google Chrome® OS, and the like) and/or mobile operating systems such as Apple iOS, Windows Phone, Windows Mobile, Android, BlackBerry OS, Blackberry 10, and Palm OS, WebOS operating systems.

Computer-readable storage medium 620 may be a non-transitory computer-readable medium configured to store software (e.g., programs, code modules, data constructs, instructions, etc.). Many of the components (e.g., web browser application 110, application 120, and services manager 130, bridge client 210, and bridge server 220) and/or processes (e.g., processes 300, 400, and 500) described above may be implemented as software that when executed by a processor or processing unit (e.g., a processor or processing unit of processing subsystem 602) performs the operations of such components and/or processes. Storage subsystem 610 may also store data used for, or generated during, the execution of the software.

Storage subsystem 610 may also include computer-readable storage medium reader 622 that is configured to communicate with computer-readable storage medium 620. Together and, optionally, in combination with system memory 612, computer-readable storage medium 620 may comprehensively represent remote, local, fixed, and/or removable storage devices plus storage media for temporarily and/or more permanently containing, storing, transmitting, and retrieving computer-readable information.

Computer-readable storage medium 620 may be any appropriate media known or used in the art, including storage media such as volatile, non-volatile, removable, non-removable media implemented in any method or technology for storage and/or transmission of information. Examples of such storage media includes RAM, ROM, EEPROM, flash memory or other memory technology, compact disc read-only memory (CD-ROM), digital versatile disk (DVD), Blu-ray Disc (BD), magnetic cassettes, magnetic tape, magnetic disk storage (e.g., hard disk drives), Zip drives, solid-state drives (SSD), flash memory card (e.g., secure digital (SD) cards, CompactFlash cards, etc.), USB flash drives, or any other type of computer-readable storage media or device.

Communication subsystem 624 serves as an interface for receiving data from, and transmitting data to, other devices, computer systems, and networks. For example, communication subsystem 624 may allow computer system 600 to connect to one or more devices via a network (e.g., a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.). Communication subsystem 624 can include any number of different communication components. Examples of such components may include radio frequency (RF) transceiver components for accessing wireless voice and/or data networks (e.g., using cellular technologies such as 2G, 3G, 4G, 5G, etc., wireless data technologies such as Wi-Fi, Bluetooth, ZigBee, etc., or any combination thereof), global positioning system (GPS) receiver components, and/or other components. In some embodiments, communication subsystem 624 may provide components configured for wired communication (e.g., Ethernet) in addition to or instead of components configured for wireless communication.

One of ordinary skill in the art will realize that the architecture shown in FIG. 6 is only an example architecture of computer system 600, and that computer system 600 may have additional or fewer components than shown, or a different configuration of components. The various components shown in FIG. 6 may be implemented in hardware, software, firmware or any combination thereof, including one or more signal processing and/or application specific integrated circuits.

Figure 7:
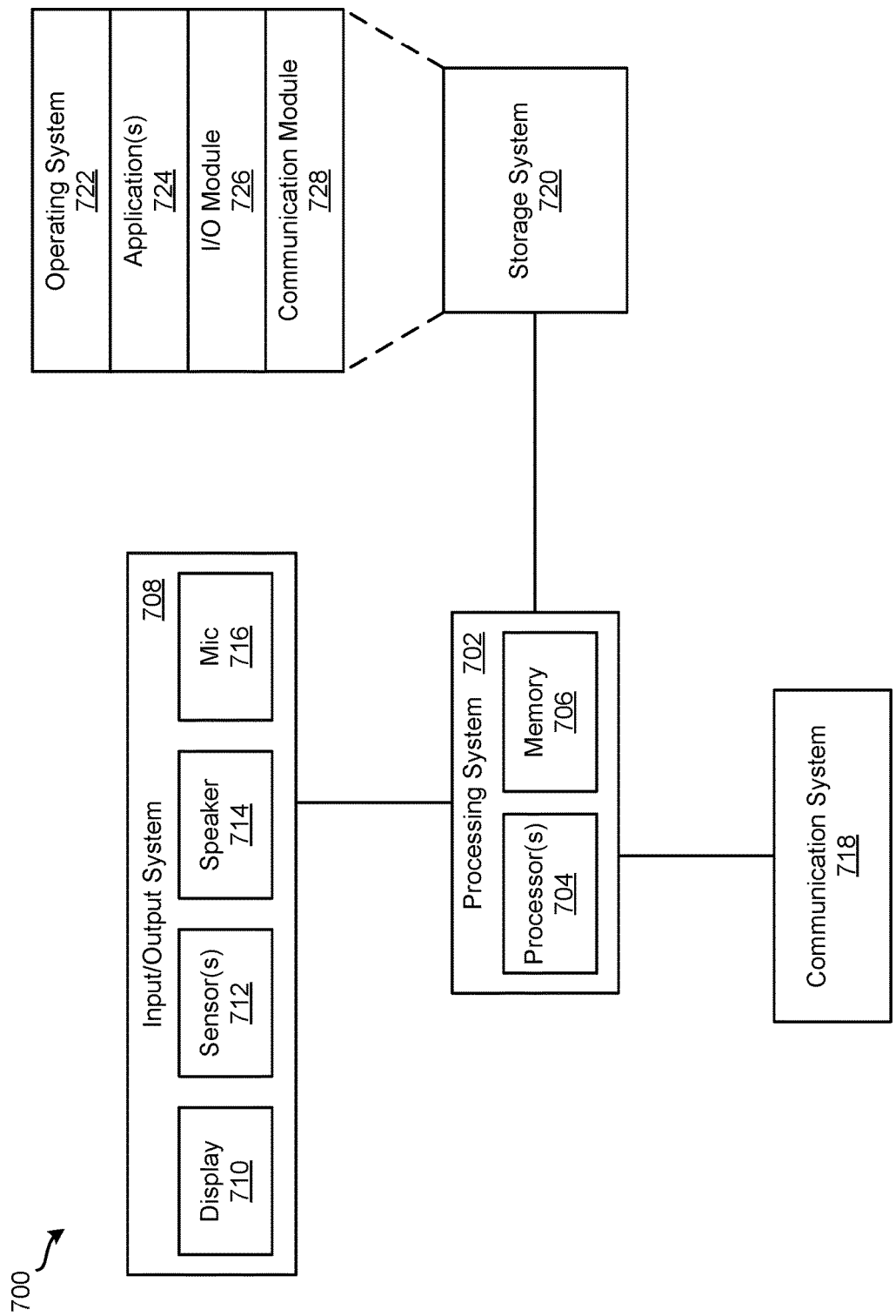
FIG. 7 illustrates an exemplary computing device for implementing various embodiments described above.

FIG. 7 illustrates an exemplary computing device 700 for implementing various embodiments described above. For example, computing device 700 may be used to implement client devices 105a-n. Computing device 700 may be a cellphone, a smartphone, a wearable device, an activity tracker or manager, a tablet, a personal digital assistant (PDA), a media player, or any other type of mobile computing device or combination thereof. Some or all elements of web browser application 110 or combinations thereof can be included or implemented in computing device 700. In addition, computing device 700 can implement many of the operations, methods, and/or processes described above (e.g., process 500). As shown in FIG. 7, computing device 700 includes processing system 702, input/output (I/O) system 708, communication system 718, and storage system 720. These components may be coupled by one or more communication buses or signal lines.

Processing system 702, which can be implemented as one or more integrated circuits (e.g., a conventional microprocessor or microcontroller), controls the operation of computing device 700. As shown, processing system 702 includes one or more processors 704 and memory 706. Processors 704 are configured to run or execute various software and/or sets of instructions stored in memory 706 to perform various functions for computing device 700 and to process data.

Each processor of processors 704 may include one processing unit (e.g., a single core processor) or several processing units (e.g., a multicore processor). In some embodiments, processors 704 of processing system 702 may be implemented as independent processors while, in other embodiments, processors 704 of processing system 702 may be implemented as multiple processors integrate into a single chip. Still, in some embodiments, processors 704 of processing system 702 may be implemented as a combination of independent processors and multiple processors integrated into a single chip.

Memory 706 may be configured to receive and store software (e.g., operating system 722, applications 724, I/O module 726, communication module 728, etc. from storage system 720) in the form of program instructions that are loadable and executable by processors 704 as well as data generated during the execution of program instructions. In some embodiments, memory 706 may include volatile memory (e.g., random access memory (RAM)), non-volatile memory (e.g., read-only memory (ROM), programmable read-only memory (PROM), erasable programmable read-only memory (EPROM), electrically erasable programmable read-only memory (EEPROM), flash memory, etc.), or a combination thereof.

I/O system 708 is responsible for receiving input through various components and providing output through various components. As shown for this example, I/O system 708 includes display 710, one or more sensors 712, speaker 714, and microphone 716. Display 710 is configured to output visual information (e.g., a graphical user interface (GUI) generated and/or rendered by processors 704). In some embodiments, display 710 is a touch screen that is configured to also receive touch-based input. Display 710 may be implemented using liquid crystal display (LCD) technology, light-emitting diode (LED) technology, organic LED (OLED) technology, organic electro luminescence (OEL) technology, or any other type of display technologies. Sensors 712 may include any number of different types of sensors for measuring a physical quantity (e.g., temperature, force, pressure, acceleration, orientation, light, radiation, etc.). Speaker 714 is configured to output audio information and microphone 716 is configured to receive audio input. One of ordinary skill in the art will appreciate that I/O system 708 may include any number of additional, fewer, and/or different components. For instance, I/O system 708 may include a keypad or keyboard for receiving input, a port for transmitting data, receiving data and/or power, and/or communicating with another device or component, an image capture component for capturing photos and/or videos, etc.

Communication system 718 serves as an interface for receiving data from, and transmitting data to, other devices, computer systems, and networks. For example, communication system 718 may allow computing device 700 to connect to one or more devices via a network (e.g., a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.). Communication system 718 can include any number of different communication components. Examples of such components may include radio frequency (RF) transceiver components for accessing wireless voice and/or data networks (e.g., using cellular technologies such as 2G, 3G, 4G, 5G, etc., wireless data technologies such as Wi-Fi, Bluetooth, ZigBee, etc., or any combination thereof), global positioning system (GPS) receiver components, and/or other components. In some embodiments, communication system 718 may provide components configured for wired communication (e.g., Ethernet) in addition to or instead of components configured for wireless communication.

Storage system 720 handles the storage and management of data for computing device 700. Storage system 720 may be implemented by one or more non-transitory machine-readable mediums that are configured to store software (e.g., programs, code modules, data constructs, instructions, etc.) and store data used for, or generated during, the execution of the software. Many of the components (e.g., web browser application 110, bridge client 210, and bridge client 220) and/or processes (e.g., process 500) described above may be implemented as software that when executed by a processor or processing unit (e.g., processors 704 of processing system 702) performs the operations of such components and/or processes.

In this example, storage system 720 includes operating system 722, one or more applications 724, I/O module 726, and communication module 728. Operating system 722 includes various procedures, sets of instructions, software components and/or drivers for controlling and managing general system tasks (e.g., memory management, storage device control, power management, etc.) and facilitates communication between various hardware and software components. Operating system 722 may be one of various versions of Microsoft Windows, Apple Mac OS, Apple OS X, Apple macOS, and/or Linux operating systems, a variety of commercially-available UNIX or UNIX-like operating systems (including without limitation the variety of GNU/Linux operating systems, the Google Chrome® OS, and the like) and/or mobile operating systems such as Apple iOS, Windows Phone, Windows Mobile, Android, BlackBerry OS, Blackberry 10, and Palm OS, WebOS operating systems.

Applications 724 can include any number of different applications installed on computing device 700. For example, web browser application 110 may be installed on computing device 700. Other examples of such applications may include an address book application, a contact list application, an email application, an instant messaging application, a word processing application, JAVA-enabled applications, an encryption application, a digital rights management application, a voice recognition application, location determination application, a mapping application, a music player application, etc.

I/O module 726 manages information received via input components (e.g., display 710, sensors 712, and microphone 716) and information to be outputted via output components (e.g., display 710 and speaker 714). Communication module 728 facilitates communication with other devices via communication system 718 and includes various software components for handling data received from communication system 718.

One of ordinary skill in the art will realize that the architecture shown in FIG. 7 is only an example architecture of computing device 700, and that computing device 700 may have additional or fewer components than shown, or a different configuration of components. The various components shown in FIG. 7 may be implemented in hardware, software, firmware or any combination thereof, including one or more signal processing and/or application specific integrated circuits.

Figure 8:
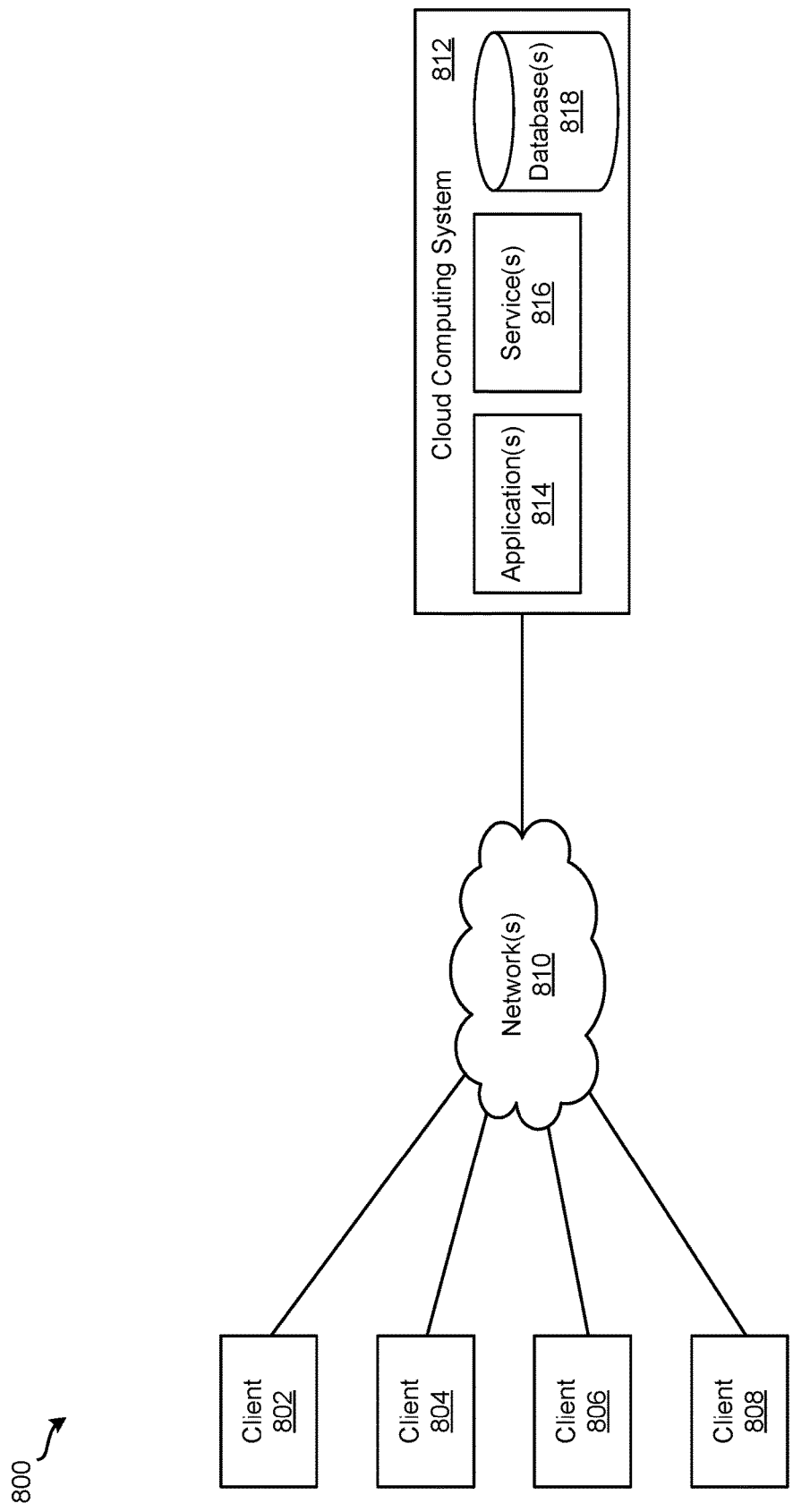
FIG. 8 illustrates an exemplary system for implementing various embodiments described above.

FIG. 8 illustrates an exemplary system 800 for implementing various embodiments described above. For example, cloud computing system 812 of system 800 may be used to implement system 100 and client devices 802-808 of system 800 may be used to implement client devices 105*a-n*. As shown, system 800 includes client devices 802-808, one or more networks 810, and cloud computing system 812. Cloud computing system 812 is configured to provide resources and data to client devices 802-808 via networks 810. In some embodiments, cloud computing system 800 provides resources to any number of different users (e.g., customers, tenants, organizations, etc.). Cloud computing system 812 may be implemented by one or more computer systems (e.g., servers), virtual machines operating on a computer system, or a combination thereof.

As shown, cloud computing system 812 includes one or more applications 814, one or more services 816, and one or more databases 818. Cloud computing system 800 may provide applications 814, services 816, and databases 818 to any number of different customers in a self-service, subscription-based, elastically scalable, reliable, highly available, and secure manner.

In some embodiments, cloud computing system 800 may be adapted to automatically provision, manage, and track a customer's subscriptions to services offered by cloud computing system 800. Cloud computing system 800 may provide cloud services via different deployment models. For example, cloud services may be provided under a public cloud model in which cloud computing system 800 is owned by an organization selling cloud services and the cloud services are made available to the general public or different industry enterprises. As another example, cloud services may be provided under a private cloud model in which cloud computing system 800 is operated solely for a single organization and may provide cloud services for one or more entities within the organization. The cloud services may also be provided under a community cloud model in which cloud computing system 800 and the cloud services provided by cloud computing system 800 are shared by several organizations in a related community. The cloud services may also be provided under a hybrid cloud model, which is a combination of two or more of the aforementioned different models.

In some instances, any one of applications 814, services 816, and databases 818 made available to client devices 802-808 via networks 810 from cloud computing system 800 is referred to as a "cloud service." Typically, servers and systems that make up cloud computing system 800 are different from the on-premises servers and systems of a customer. For example, cloud computing system 800 may host an application and a user of one of client devices 802-808 may order and use the application via networks 810.

Applications 814 may include software applications that are configured to execute on cloud computing system 812 (e.g., a computer system or a virtual machine operating on a computer system) and be accessed, controlled, managed, etc. via client devices 802-808. In some embodiments, applications 814 may include server applications and/or mid-tier applications (e.g., HTTP (hypertext transport protocol) server applications, FTP (file transfer protocol) server applications, CGI (common gateway interface) server applications, JAVA server applications, etc.). Services 816 are software components, modules, application, etc. that are configured to execute on cloud computing system 812 and provide functionalities to client devices 802-808 via networks 810. Services 816 may be web-based services or on-demand cloud services.

Databases 818 are configured to store and/or manage data that is accessed by applications 814, services 816, and/or client devices 802-808. For instance, collaboration sessions storage 140 may be stored in databases 818. Databases 818 may reside on a non-transitory storage medium local to (and/or resident in) cloud computing system 812, in a storage-area network (SAN), on a non-transitory storage medium local located remotely from cloud computing system 812. In some embodiments, databases 818 may include relational databases that are managed by a relational database management system (RDBMS). Databases 818 may be a column-oriented databases, row-oriented databases, or a combination thereof. In some embodiments, some or all of databases 818 are in-memory databases. That is, in some such embodiments, data for databases 818 are stored and managed in memory (e.g., random access memory (RAM)).

Client devices 802-808 are configured to execute and operate a client application (e.g., a web browser, a proprietary client application, etc.) that communicates with applications 814, services 816, and/or databases 818 via networks 810. This way, client devices 802-808 may access the various functionalities provided by applications 814, services 816, and databases 818 while applications 814, services 816, and databases 818 are operating (e.g., hosted) on cloud computing system 800. Client devices 802-808 may be computer system 600 or computing device 700, as described above by reference to FIGS. 6 and 7, respectively. Although system 800 is shown with four client devices, any number of client devices may be supported.

Networks 810 may be any type of network configured to facilitate data communications among client devices 802-808 and cloud computing system 812 using any of a variety of network protocols. Networks 810 may be a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A non-transitory machine-readable medium storing a program executable by at least one processing unit of a computing device, the program comprising sets of instructions for:

interacting, through a first page of a web browser application, with an application hosted on a first domain of a cloud computing system, the first page of the web browser application configured to retrieve and display information resources hosted on the first domain;

establishing, through a second page of the web browser application, a bidirectional communication channel with a service instance hosted on a second domain of the cloud computing system, the second page of the web browser application embedded in the first page of the web browser application and configured to retrieve and display information resources hosted on the second domain, the service instance configured to facilitate communication for a collaboration session between the computing device and a set of computing devices interacting with the application;

receiving, at the second page via the bidirectional communication channel, first data for the collaboration session from the service instance, the first data originating from one of the set of computing devices;

forwarding the first data from the second page to the first page for displaying at least a portion of the first data on the first page;

receiving second data for the collaboration session via the first page; and forwarding the second data from the first page to the second page and transmitting the second data through the bidirectional communication channel to the service instance.

2. The non-transitory machine-readable medium of claim 1, wherein the program further comprises sets of instructions for:

sending a request to join the collaboration session; and in response to the request, receiving a collaboration session identifier associated with the collaboration session.

3. The non-transitory machine-readable medium of claim 2, wherein the service instance is a first service instance in a plurality of service instances hosted on the second domain, wherein establishing the bidirectional communication channel with the service instance comprises:

sending the collaboration session identifier to a load balancer of the cloud computing system for the load balancer to forward the request to a second service instance in the plurality of service instances; and receiving, via the load balancer, a session identifier associated with the first service instance and a service identifier associated with the first service instance.

4. The non-transitory machine-readable medium of claim 3, wherein the request is a first request, wherein establishing the bidirectional communication channel with the service instance further comprises sending a second request that includes the session identifier and the service identifier to the load balancer for the load balancer to determine to forward the second request to the service instance based on the service identifier.

5. The non-transitory machine-readable medium of claim 4, wherein the second request is a hypertext transfer protocol request, wherein establishing the bidirectional communication channel with the service instance further comprises including the session identifier and the service identifier in a header of the second request.

6. The non-transitory machine-readable medium of claim 1, wherein the second data originates from the computing device.

7. The non-transitory machine-readable medium of claim 1, wherein the bidirectional communication channel is a Websocket communication channel.

8. A method, executable by a computing device, comprising:

interacting, through a first page of a web browser application, with an application hosted on a first domain of a cloud computing system, the first page of the web browser application configured to retrieve and display information resources hosted on the first domain;

establishing, through a second page of the web browser application, a bidirectional communication channel with a service instance hosted on a second domain of the cloud computing system, the second page of the web browser application embedded in the first page of the web browser application and configured to retrieve and display information resources hosted on the second domain, the service instance configured to facilitate communication for a collaboration session between the computing device and a set of computing devices interacting with the application;

receiving, at the second page via the bidirectional communication channel, first data for the collaboration session from the service instance, the first data originating from one of the set of computing devices;

forwarding the first data from the second page to the first page for displaying at least a portion of the first data on the first page;

receiving second data for the collaboration session via the first page; and forwarding the second data from the first page to the second page and transmitting the second data through the bidirectional communication channel to the service instance.

9. The method of claim 8 further comprising:

sending a request to join the collaboration session; and in response to the request, receiving a collaboration session identifier associated with the collaboration session.

10. The method of claim 9, wherein the service instance is a first service instance in a plurality of service instances hosted on the second domain, wherein establishing the bidirectional communication channel with the service instance comprises:

sending the collaboration session identifier to a load balancer of the cloud computing system for the load balancer to forward the request to a second service instance in the plurality of service instances; and receiving, via the load balancer, a session identifier associated with the first service instance and a service identifier associated with the first service instance.

11. The method of claim 10, wherein the request is a first request, wherein establishing the bidirectional communication channel with the service instance further comprises sending a second request that includes the session identifier and the service identifier to the load balancer for the load balancer to determine to forward the second request to the service instance based on the service identifier.

12. The method of claim 11, wherein the second request is a hypertext transfer protocol request, wherein establishing the bidirectional communication channel with the service instance further comprises including the session identifier and the service identifier in a header of the second request.

13. The method of claim 8, wherein the second data originates from the computing device.

14. The method of claim 8, wherein the bidirectional communication channel is a Websocket communication channel.

15. A system comprising:

a set of processors; and a non-transitory computer-readable medium storing instructions that when executed by at least one processor in the set of processors cause the at least one processor to:

interact, through a first page of a web browser application, with an application hosted on a first domain of a cloud computing system, the first page of the web browser application configured to retrieve and display information resources hosted on the first domain;

establish, through a second page of the web browser application, a bidirectional communication channel with a service instance hosted on a second domain of the cloud computing system, the second page of the web browser application embedded in the first page of the web browser application and configured to retrieve and display information resources hosted on the second domain, the service instance configured to facilitate communication for a collaboration session between the system and a set of computing devices interacting with the application;

receive, at the second page via the bidirectional communication channel, first data for the collaboration session from the service instance, the first data originating from one of the set of computing devices;

forward the first data from the second page to the first page for displaying at least a portion of the first data on the first page;

receive second data for the collaboration session via the first page; and forward the second data from the first page to the second page and transmitting the second data through the bidirectional communication channel to the service instance.

16. The system of claim 15, wherein the instructions further cause the at least one processor to:

send a request to join the collaboration session; and in response to the request, receive a collaboration session identifier associated with the collaboration session.

17. The system of claim 16, wherein the service instance is a first service instance in a plurality of service instances hosted on the second domain, wherein establishing the bidirectional communication channel with the service instance comprises:

sending the collaboration session identifier to a load balancer of the cloud computing system for the load balancer to forward the request to a second service instance in the plurality of service instances; and receiving, via the load balancer, a session identifier associated with the first service instance and a service identifier associated with the first service instance.

18. The system of claim 17, wherein the request is a first request, wherein establishing the bidirectional communication channel with the service instance further comprises sending a second request that includes the session identifier and the service identifier to the load balancer for the load balancer to determine to forward the second request to the service instance based on the service identifier.

19. The system of claim 18, wherein the second request is a hypertext transfer protocol request, wherein establishing the bidirectional communication channel with the service instance further comprises including the session identifier and the service identifier in a header of the second request.

20. The system of claim 15, wherein the second data originates from the system.

* * * * *